(12) United States Patent
Gomes De Araújo et al.

(10) Patent No.: US 9,650,820 B2
(45) Date of Patent: May 16, 2017

(54) STRUCTURAL ARRANGEMENT IN PNEUMATIC FLOOR SPRING

(71) Applicants: Mauricio Pereira, Cuiaba MT (BR); Edgar Stuelp, Jr., Balneario Camboriu SC (BR); Saulo Claro Ferreira, Campinas SP (BR); Carlos Eduardo De Paulo, Cuiaba MT (BR)

(72) Inventors: Maria do Socorro Gomes De Araújo, Fortaleza (BR); Maia Turibio Gurgel, Fortaleza (BR); Francisco Alan Freitas Marinho, Fortaleza (BR)

(73) Assignees: Mauricio Pereira, Cuiaba MT (BR); Carlos Eduardo De Paulo, Cuiaba MT (BR); Edgar Stuelp, Jr., Balneario Camboriu SC (BR); Saulo Claro Ferreira, Campinas SP (BR)

( * ) Notice: Subject to any disclaimer, the term of this patent is extended or adjusted under 35 U.S.C. 154(b) by 0 days.

(21) Appl. No.: 14/781,906

(22) PCT Filed: Aug. 2, 2013

(86) PCT No.: PCT/BR2013/000283
§ 371 (c)(1),
(2) Date: Oct. 1, 2015

(87) PCT Pub. No.: WO2014/161053
PCT Pub. Date: Oct. 9, 2014

(65) Prior Publication Data
US 2016/0060929 A1    Mar. 3, 2016

Related U.S. Application Data

(63) Continuation of application No. PCT/BR2013/000283, filed on Aug. 2, 2013.

(30) Foreign Application Priority Data

Apr. 4, 2013  (BR) .......................... 20 2013 008224

(51) Int. Cl.
*E05D 7/081*     (2006.01)
*E05F 3/14*      (2006.01)
(Continued)

(52) U.S. Cl.
CPC ............... *E05D 7/081* (2013.01); *E05F 3/14* (2013.01); *E05F 5/00* (2013.01); *F16F 9/0218* (2013.01);
(Continued)

(58) Field of Classification Search
CPC ... Y10T 16/552; Y10T 16/62; Y10T 16/2774; Y10T 16/281; Y10T 16/283;
(Continued)

(56) References Cited

U.S. PATENT DOCUMENTS

| 665,603 | A | * | 1/1901 | Henry | ........ E05F 3/04 16/229 |
| 5,265,311 | A | * | 11/1993 | Gard | ......... E05F 1/06 16/311 |

(Continued)

*Primary Examiner* — William Miller

(57) ABSTRACT

A structural arrangement is described in pneumatic floor spring of reduced dimensions, which requires a hole in the floor for its installation, providing a shielded structure that prevents the water accumulation, such pneumatic floor spring keeps the door closed by the force exerted by the plunger and when the door is opened, the pin spins along with the cam which, with the double helicoil, pushes the descendent track and the plunger.

5 Claims, 4 Drawing Sheets

(51) Int. Cl.
  *E05F 5/00* (2017.01)
  *F16F 9/02* (2006.01)
(52) U.S. Cl.
  CPC ... *E05Y 2201/266* (2013.01); *E05Y 2201/638* (2013.01); *E05Y 2900/10* (2013.01); *Y10T 16/552* (2015.01)
(58) Field of Classification Search
  CPC . Y10T 16/304; Y10T 16/534; Y10T 16/5398; E05D 7/08; E05D 7/081; E05D 5/0246; E05F 3/14; E05F 3/20; E05F 1/063; E05F 5/00; E05Y 2900/10; E05Y 2900/132; E05Y 2201/266; E05Y 2201/638; F16F 9/0218
  USPC .......... 16/378, 84, 55, 66, 68, 50, 252, 312; 49/388, 398, 236, 239
  See application file for complete search history.

(56) References Cited

U.S. PATENT DOCUMENTS

| | | | |
|---|---|---|---|
| 8,191,206 B1 * | 6/2012 | Bacchetti | E05D 11/1014 16/378 |
| 8,443,487 B2 * | 5/2013 | Bacchetti | E05F 3/104 16/252 |
| 8,813,313 B2 * | 8/2014 | Freitas Marinho | E05F 1/14 16/378 |
| 2006/0123598 A1 * | 6/2006 | Park | E05F 3/02 16/378 |

* cited by examiner

STRUCTURAL ARRANGEMENT IN PNEUMATIC FLOOR SPRING

CROSS-REFERENCE TO RELATED APPLICATIONS

This application is a National Stage of International Application No. PCT/BR2013/000283, filed Aug. 2, 2013, that claims priority under 35 U.S.C. 119(b) to BR 20 2013 008224 filed Apr. 4, 2013.

FIELD OF THE INVENTION

The present invention relates to door springs for opening and closing thereof and, more specifically, to a pneumatic floor spring with reduced dimensions, environmentally shielded construction, and improved installation for glass and wooden doors.

BACKGROUND OF THE INVENTION

Floor springs are constructed in various designs to make the door automatic opening and closing, with the minimum effort, for both sides, and having for both sides a fixed stop function, thereby maintaining the door stopped at one point at about 90 degrees (90°) and allowing a return to the door closing in a manner that occurs lightly and gently.

The state-of-the-art describes hydraulic springs applied on glass doors and air springs on wooden doors that ensure the door smooth closing, without the risk of hitting the mark, also allowing the door retention in a 90 degrees (90°) angle of aperture. However, for these hydraulic floor spring installations it is necessary to install and concrete the spring box on the floor, thereby affecting the floor aesthetics. Also, these hydraulic springs have a high cost, sometimes higher than the door cost, which makes its application in several projects impractical.

SUMMARY OF THE INVENTION

Therefore, the object of an embodiment of the present invention is to provide a pneumatic floor spring of reduced dimensions, which requires a hole in the floor for its installation, providing a shielded structure that prevents water accumulation, which is a situation observed in the conventional hydraulic floor springs that do not feature a shielded structure, these conventional hydraulic floor springs being subject to problems such as oxidation.

A feature of the utility model is a pneumatic floor spring with reduced dimensions compared to the state-of-the-art hydraulic springs, with minimal aesthetic interference in the environment where it will be installed.

A feature of the utility model is a pneumatic floor spring of low cost due to assembly simplicity.

A feature of the utility model is a pneumatic floor spring which installation time is extremely reduced in view of requiring just a hole in the floor for positioning of the metal plate that makes up the spring, unlike the state-of-the-art which requires to break the floor with tools, making a cut of about 300 mm, in an operation that takes about 2 hours and a half.

A feature of the utility model is a pneumatic floor spring of little weight compared to the hydraulic floor springs, with 0.285 grams on average, unlike the 3 to 6 kilograms of hydraulic springs.

BRIEF DESCRIPTION OF THE DRAWINGS

In order to better describe the technical features of the pneumatic floor spring structural arrangement the following figures are presented.

DETAILED DESCRIPTION OF THE INVENTION

Figure 1:
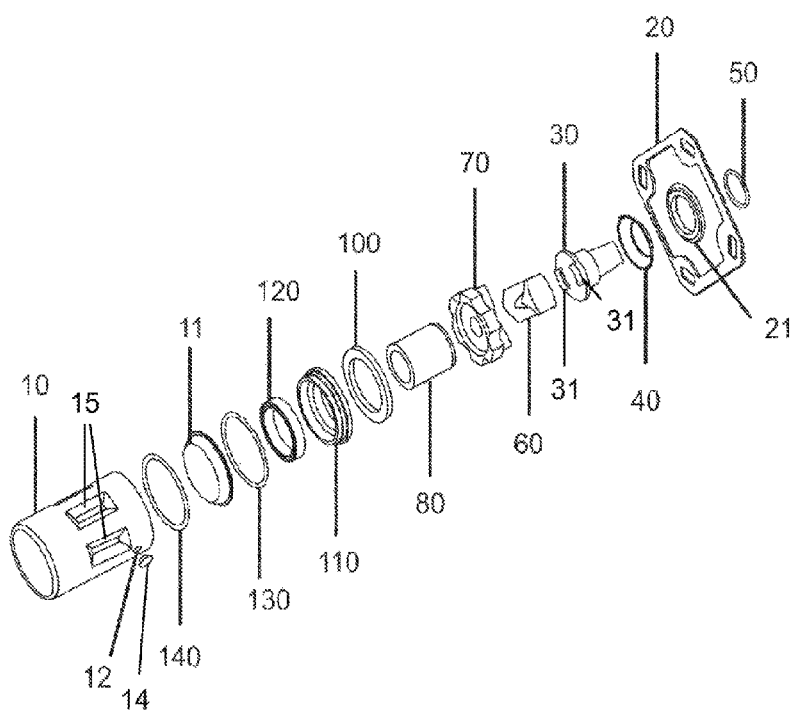
FIG. 1 shows the exploded view of the pneumatic floor spring.
Figure 2:
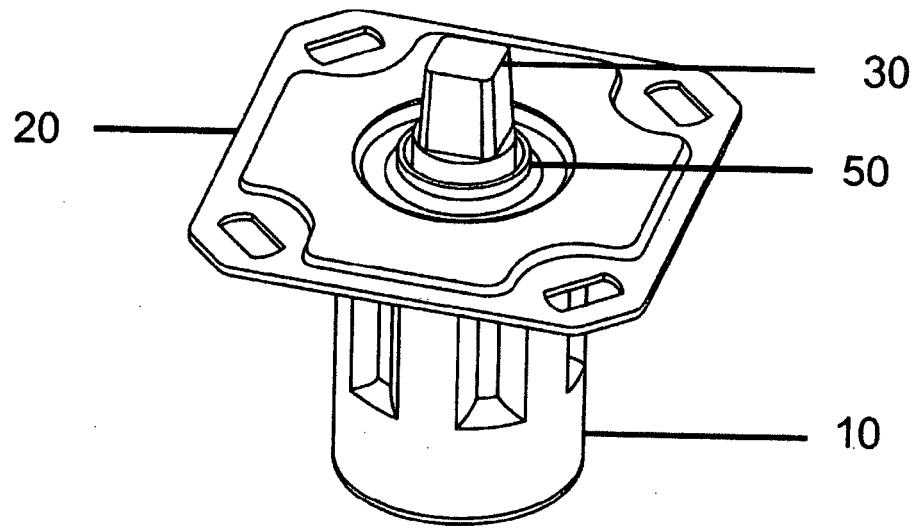
FIG. 2 shows the assembly view.
Figure 3:
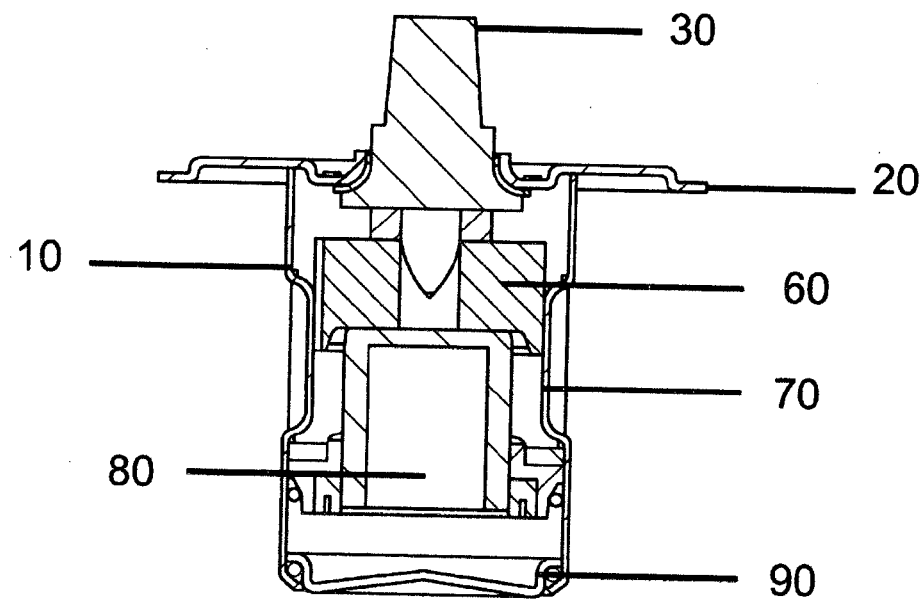
FIG. 3 shows the cutaway view.

An object of the pneumatic floor spring of an embodiment of the present invention, comprises a tube 10 with an opening at the ends, and with a lid in one of the ends 20 welded to such tube 10.

The lid 20 has a centralized thru-hole 21 where an extension pin 30 is externally projected, located inside the tube 10 to the door fitting, such pin 30 is positioned in a bushing 40 and sealed by an O-ring 50.

On the opposite end to the pin projection 30 there is a protrusion for a coupling cam with double helicoid 60 supported on the opposite face in track 70 that fits in the tube grooves 10, blocking such track 70.

The upper set assembly formed by the pin 30, cam 60 and track 70 is pushed upwards by the plunger 80 from a pressurized low chamber 90), such plunger 80 which at one and rests at the track base 70 and, on the opposite side, features a support ring 100 and a guide ring 110 sealed by the gasket 120 and O-ring 130, seated on the base 11 of the tube 10 positioned on the opposite end to the lid 21 sealed by an O-ring 140.

The tube 10 features an opening on the surface 12 provided with an oil cover or lid 14 for the oil supply.

Figure 4:
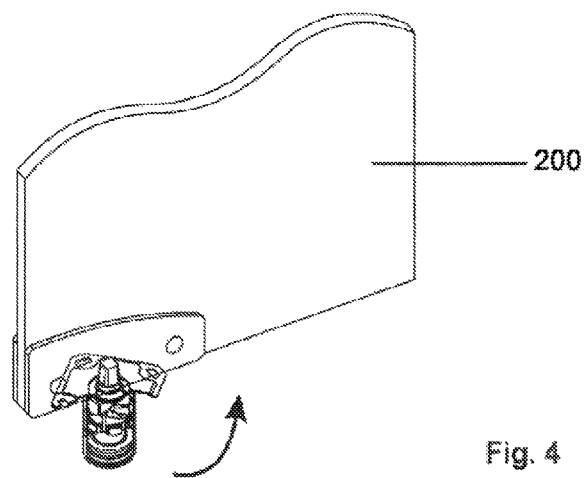
FIG. 4 shows the pneumatic spring installed in a door.
Figure 4A:
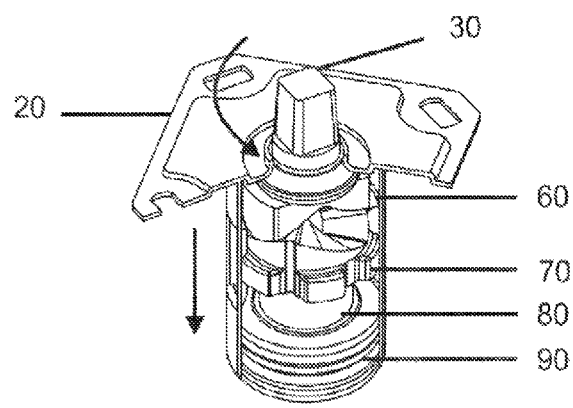
FIG. 4A shows the spring detail in the door opening operation.
Figure 5:
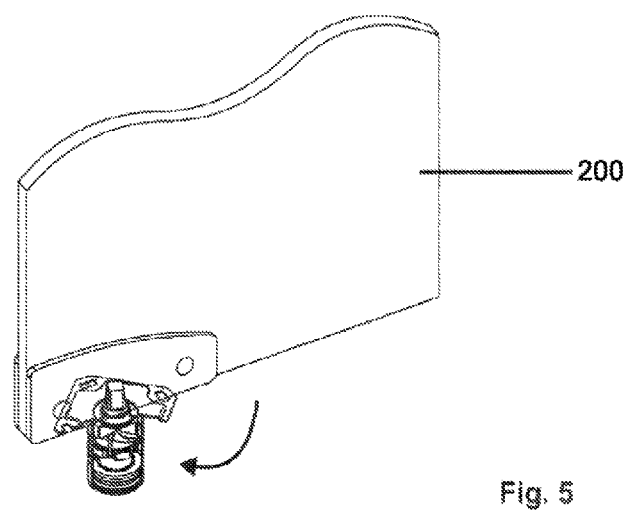
FIG. 5 shows the pneumatic floor spring installed in a door.
Figure 5A:
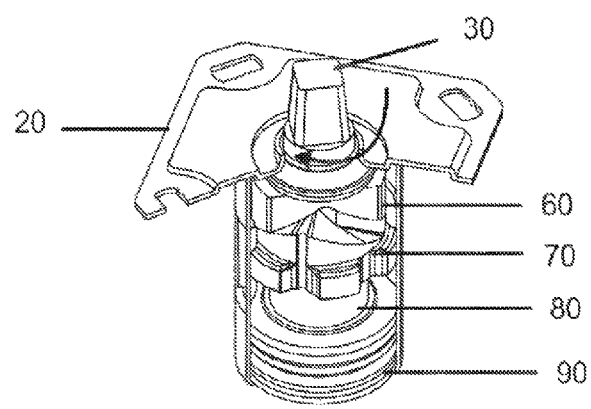
FIG. 5A shows the floor spring detail in the door closing operation.

In operation, the door 200 assembled on the pin 30 is kept closed by the force exerted by plunger 80. When the door 200 is opened, the pin 30 spins along with the cam 60 which, with the double helicoid, pushes the descendent track 70 and plunger 80, as shown in FIG. 4A. When the door 200 is released before completing the 90 degrees opening, the door 200 is closed by the pressure exerted by the pressurized chamber 90 on the plunger 80) that pushes up the track 70 where it is kept closed, as shown in FIG. 5A.

If the door 200 is opened to 90 degrees (90°), a flat area of the double helicoid keeps the track 70 and coupling cam 60 is blocked, thereby positioning the door 200 in an open position.

If the pneumatic floor spring of the present invention is being installed in the center of the door 200, the door leaf opens to 360 degrees (360°).

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pneumatic floor spring comprising a tube with an opening on a surface provided with a cover for an oil supply, the tube with openings at each end and with one of the ends fitted with a lid welded to the tube, the lid which features a centralized thru-tube where externally projects an extension pin positioned in an inner portion of the tube for a door fitting, the extension pin is configured to be positioned on a bushing and sealed by an O-ring, featured by the fact the opposite end to the pin projection has a protrusion for a coupling cam with double helicoid supported on the face opposite in a track which fits in one or more grooves of the tube blocking the track, an upper set assembly formed by the pin, the coupling cam with double helicoid, and the track is pushed upward by a plunger of a pressurized lower chamber, the plunger at one end rests on a track base and on an opposite side provides a support ring and a guide ring sealed by a gasket and O-ring, seated on a base of the tube positioned on the opposite end to the lid sealed by an O-ring.

2. A pneumatic spring for inserting into a hole to operate a door, comprising:
   an enclosure adapted to be received by the hole, said enclosure configured as a tube with open ends with one end adapted to receive a base and the other end adapted to be joined to a lid with a centralized thru-tube;
   a pressurized chamber adapted to be inserted in said enclosure, said pressurized chambered configured with a plunger disposed in a guide ring sealed by a gasket and an O-ring, said pressurized chamber configured to be seated on the base and sealed by an O-ring to said end of said enclosure of the tube positioned on the opposite end to the lid;
   an upper set assembly configured with:
      an extension pin configured with a bushing and sealed by an O-ring and to project through said centralized thru-tube whereby the opposite end to the pin projection includes at least two projections;
      a coupling cam configured with one end having a double helical surface with flat surface portions, said coupling cam configured with its other and end adapted to be received and held by said at least two projections of said extension pin; and
      a track configured with a flat surface adapted to be supported on said pneumatic assembly and to operably couple to said double helical surface of said coupling cam, said track fits in one or more tube grooves blocking the rotation of said track;
   whereby said pneumatic floor spring keeps the door closed by the force exerted by the plunger settling adjacent the flat surfaces of each said coupling cam and said track, and when the door is opened, the extension pin rotates the double helical surface of the coupling cam so as to push downwardly the opposite surface of said track forcing the plunger to compress the pneumatic assembly thereby opening the door with the flat area of the double helical surface for each of said coupling cam and said track maintaining the door in an open position.

3. The pneumatic spring of claim 2, wherein said tube further comprises one or more tube grooves formed in an outer surface thereof adapted to interface with a blocking track disposed in said tube so as to hold and secure said blocking track from rotating.

4. The pneumatic spring of claim 3, wherein said pneumatic assembly further includes a support ring disposed between said blocking track and said guide ring.

5. The pneumatic spring of claim 3, wherein said extension pin being adapted to be positioned in an inner portion of the tube for a door fitting.

\* \* \* \* \*